US011509955B2

(12) United States Patent
Nezu

(10) Patent No.: US 11,509,955 B2
(45) Date of Patent: Nov. 22, 2022

(54) DISPLAY SYSTEM, DISPLAY METHOD, AND PROGRAM

(71) Applicant: NEC Display Solutions, Ltd., Tokyo (JP)

(72) Inventor: Eifu Nezu, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/044,465

(22) PCT Filed: May 31, 2018

(86) PCT No.: PCT/JP2018/020936
§ 371 (c)(1),
(2) Date: Oct. 1, 2020

(87) PCT Pub. No.: WO2019/229926
PCT Pub. Date: Dec. 5, 2019

(65) Prior Publication Data
US 2021/0144438 A1 May 13, 2021

(51) Int. Cl.
*H04N 21/442* (2011.01)
*G06V 40/19* (2022.01)
*G06V 40/16* (2022.01)

(52) U.S. Cl.
CPC ..... *H04N 21/44218* (2013.01); *G06V 40/166* (2022.01); *G06V 40/172* (2022.01); *G06V 40/19* (2022.01); *G06V 40/171* (2022.01)

(58) Field of Classification Search
CPC ........... G06K 9/00604; G06K 9/00255; G06K 9/00281; G06K 9/00228; G06K 9/00778;
(Continued)

(56) References Cited

U.S. PATENT DOCUMENTS

2014/0316543 A1* 10/2014 Sharma .................. H04L 67/10
700/94
2015/0033253 A1* 1/2015 Yoshioka ........... H04N 21/4113
725/32
(Continued)

FOREIGN PATENT DOCUMENTS

CN 102822787 A 12/2012
CN 103202031 A 7/2013
(Continued)

OTHER PUBLICATIONS

International Search Report (ISR) (PCT Form PCT/ISA/210), in PCT/JP2018/020936, dated Aug. 28, 2018.
(Continued)

*Primary Examiner* — Chenea Davis
(74) *Attorney, Agent, or Firm* — McGinn I.P. Law Group, PLLC.

(57) ABSTRACT

A display system includes: a plurality of secondary display units that respectively display a plurality of videos; a primary display unit that displays at least one of the plurality of videos; a detection unit that detects a number of viewers of each of the plurality of secondary display units; and a control unit that causes the primary display unit to display a same video as the video being displayed by the secondary display unit having a highest number of viewers among the plurality of secondary display units, based on the numbers of viewers detected by the detection unit.

11 Claims, 3 Drawing Sheets

(58) Field of Classification Search
CPC ............ G06K 9/00288; H04N 21/442; H04N 21/436; H04N 21/462; H04N 21/44218
See application file for complete search history.

(56) References Cited

U.S. PATENT DOCUMENTS

2015/0363698 A1* 12/2015 Kritt .................. G06Q 30/0254
  706/11
2015/0381932 A1* 12/2015 Louchheim ............ G06V 40/20
  348/14.07
2017/0286047 A1* 10/2017 Patil ................ H04N 21/42204

FOREIGN PATENT DOCUMENTS

| CN | 104159157 A | 11/2014 |
|----|-------------|---------|
| JP | 2007-265125 A | 10/2007 |
| JP | 2008-112401 A | 5/2008 |
| JP | 2011-223169 A | 11/2011 |
| JP | 2012-015917 A | 1/2012 |
| JP | 2012-134836 A | 7/2012 |
| JP | 2018-025734 A | 2/2018 |

OTHER PUBLICATIONS

Chinese Office Action, dated Nov. 15, 2021, in Chinese Application No. 201880092767.8 and English Translation thereof.

* cited by examiner

DISPLAY SYSTEM, DISPLAY METHOD, AND PROGRAM

TECHNICAL FIELD

The present invention relates to a display system, a display method, and a program.

BACKGROUND ART

A technique is known in which the display content of video content is determined based on factors such as a user's behavior and history, and then displayed on a display unit (for example, see Patent Document 1 and Patent Document 2). According to the system described in Patent Document 1, it is possible to detect the behavior of a child or an animal near a TV receiver, select video content that draws the attention of the child or the animal, and then display the video content on the TV receiver. According to the system described in Patent Document 2, it is possible to infer the content that a current group of viewers wants to watch from the viewing history of the viewers.

PRIOR ART DOCUMENTS

Patent Document

[Patent Document 1] Japanese Unexamined Patent Application, First Publication No. 2011-223169
[Patent Document 2] Japanese Unexamined Patent Application, First Publication No. 2012-015917

SUMMARY OF THE INVENTION

Problem to be Solved by the Invention

When the related techniques are applied to a system which includes a large main monitor and a plurality of sub-monitors, the display content which is displayed on the main monitor reflects the tastes of the viewer of the main monitor and the display content which is displayed on each of the sub-monitors reflects the tastes of the viewer of each sub-monitor. It is desirable for the display content which is most popular among the viewers to be displayed on the main monitor. However, when the related techniques are applied, the video content which is popular among the viewers is not always displayed on the main monitor, and video content having few viewers may continue to be displayed on the main monitor.

The present invention has been made in view of the above circumstances, and has an object of providing a display system, a display method, and a program capable of displaying display content that more accurately reflects the tastes of viewers.

Means for Solving the Problem

In order to solve the problem described above, an example aspect of the present invention is a display system including: a plurality of secondary display units that respectively display a plurality of videos; a primary display unit that displays at least one of the plurality of videos; a detection unit that detects a number of viewers of each of the plurality of secondary display units; and a control unit that causes the primary display unit to display a same video as the video being displayed by the secondary display unit having a highest number of viewers among the plurality of secondary display units, based on the numbers of viewers detected by the detection unit.

Furthermore, an example aspect of the present invention is a display method executed by a computer, including: displaying a plurality of videos on a plurality of secondary display units, respectively; displaying at least one of the plurality of videos on a primary display unit; detecting a number of viewers of each of the plurality of secondary display units; and displaying, on the primary display unit, a same video as the video being displayed by the secondary display unit having a highest number of viewers among the plurality of secondary display units, based on the detected numbers of viewers.

Moreover, an example aspect of the present invention is a program that causes a computer to execute: causing a plurality of secondary display units to respectively display a plurality of display content; causing a primary display unit to display at least one of the plurality of videos; detecting a number of viewers of each of the plurality of secondary display units; and causing the primary display unit to display a same video as the video being displayed by the secondary display unit having a highest number of viewers among the plurality of secondary display units, based on the detected numbers of viewers.

Effect of the Invention

According to the present invention, a display system, a display method, and a program are capable of displaying display content that more accurately reflects the tastes of viewers.

EXAMPLE EMBODIMENT

Figure 1:
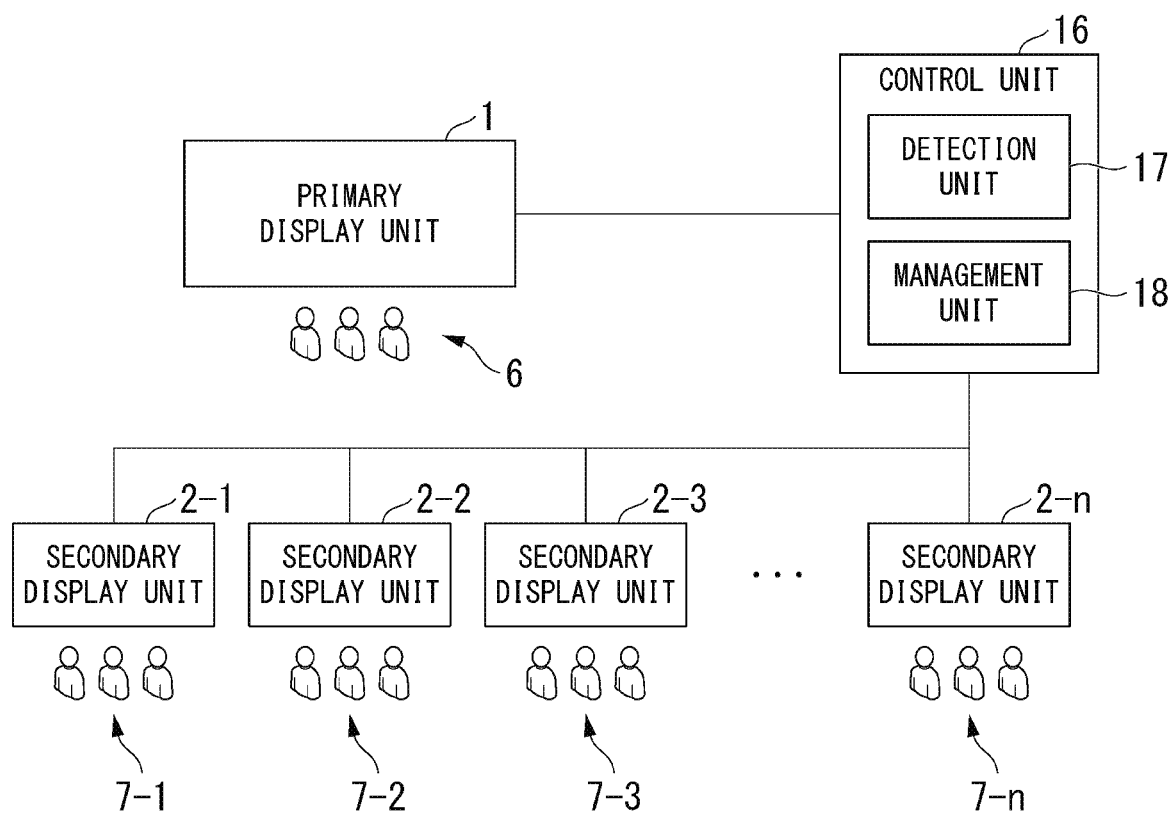
FIG. 1 is a block diagram showing a configuration of a display system 100.

Hereunder, a display system according to an example embodiment of the present invention will be described with reference to the drawings. FIG. 1 is a block diagram showing a configuration of a display system 100. The display system 100 includes a primary display unit 1, a plurality of secondary display units 2-n (where n is an arbitrary natural number), a control unit 16, a detection unit 17, and a management unit 18. The primary display unit 1 displays a display target. The plurality of secondary display units 2-n respectively displays a plurality of display targets. The display targets are, for example, video content. The display targets may also be other content, such as still images or text. The primary display unit 1 displays at least one of the plurality of videos displayed by the plurality of secondary display units 2-n.

The detection unit 17 detects the number of viewers 7-n of each of the plurality of secondary display units 2-n. The management unit 18 manages the display content of the primary display unit 1 and each of the plurality of secondary display units 2-n. The control unit 16 acquires, from the management unit 18, information about a first display content being displayed by the secondary display unit 2-n having the highest number of viewers 7-n among the plurality of secondary display units 2-n, based on the viewers 7-n detected by the detection unit 17, and causes the primary display unit 1 to display the first display content based on the information.

Figure 2:
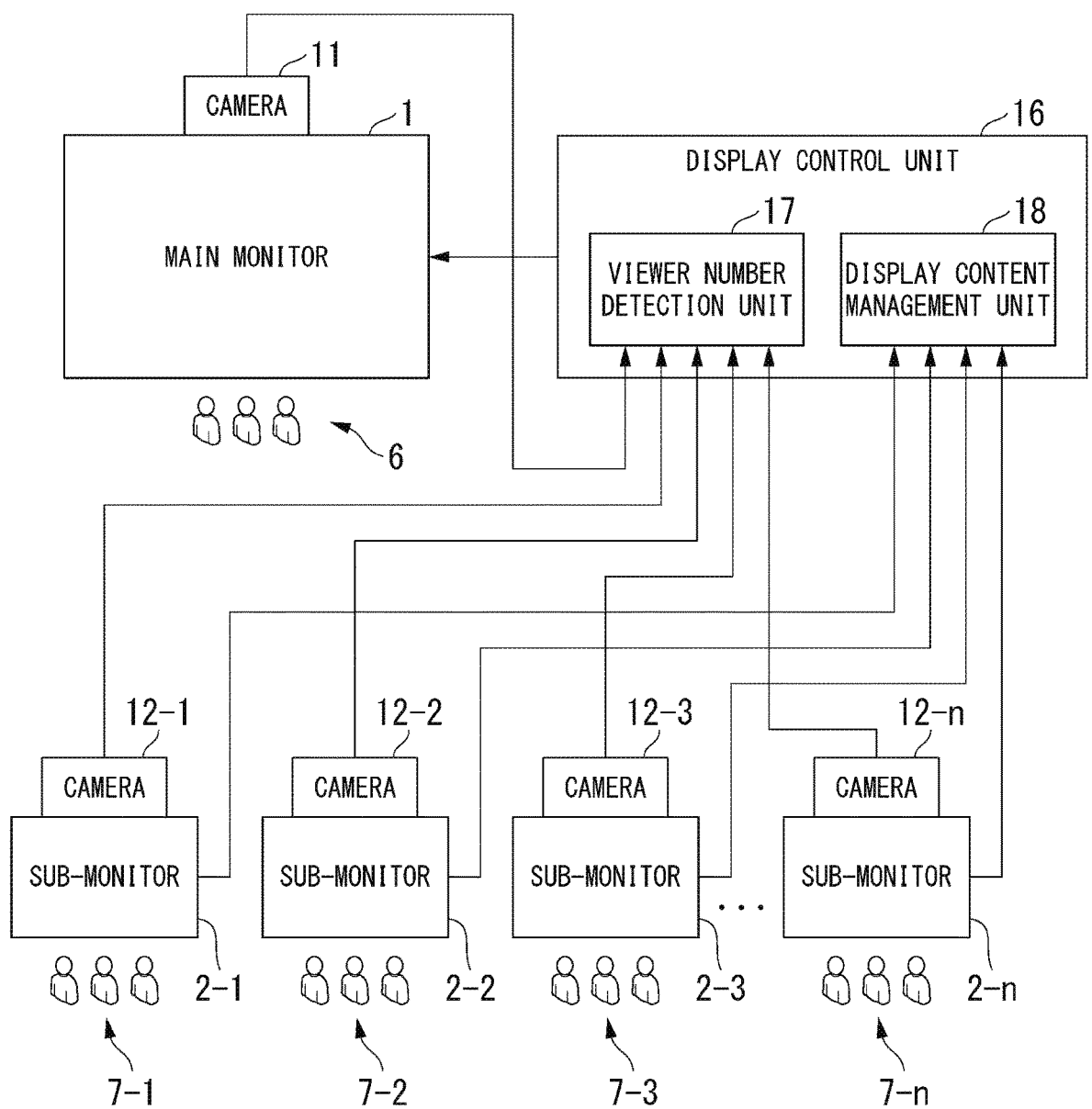
FIG. 2 is a block diagram showing a detailed configuration of the display system 100.

Next, a detailed configuration of the display system 100 of the example embodiment will be described. FIG. 2 is a block diagram showing a detailed configuration of the display system 100. The display system 100 includes a main monitor 1 (primary display unit), a plurality of sub-monitors 2-n (secondary display units), a display control unit 16 (control unit), a viewer number detection unit 17 (detection unit), and a display content management unit 18 (management unit).

The main monitor 1 is, for example, a large display device that displays a display target such as video content. For example, a display device such as a liquid crystal display, an LED (Light Emitting Diode) display, or an organic EL (Organic Electro-Luminescence) display is used as the main monitor 1. The main monitor 1 may be one that is projected by a projector.

The main monitor 1 is provided with a camera 11 (first imaging unit) for detecting the number of viewers that are viewing the display content displayed on the main monitor 1. The camera 11 may be provided inside the casing of the main monitor 1, or may be externally provided outside the casing of the main monitor 1.

The sub-monitors 2-n are, for example, display devices which are smaller than the main monitor 1 that display a display target such as video content. For example, it is possible to use as the sub-monitors 2-n a display device such as a liquid crystal display, an LED display, or an organic EL display. The sub-monitors 2-n may be projected by a projector.

The sub-monitors 2-n are provided with cameras 12-n (second imaging units) for detecting the number of viewers 7-n that are viewing the display content displayed on the sub-monitors 2-n. The cameras 12-n may be provided inside the casing of the sub-monitors 2-n, or may be externally provided outside the casing of the sub-monitors 2-n.

The display control unit 16 controls the display content which is displayed on the main monitor 1 and the plurality of sub-monitors 2-n. The display control unit 16 includes, for example, a viewer number detection unit 17 and a display content management unit 18. The viewer number detection unit 17 and the display content management unit 18 are described as being individual functional units in the display control unit 16. However, the functional units may be configured separately or may be configured as a single functional unit.

The display control unit 16 causes the main monitor 1 to display a display target. The display control unit 16 causes the plurality of sub-monitors 2-n to display a display target. The display control unit 16 causes the plurality of sub-monitors 2-n to displays different display targets, for example.

The viewer number detection unit 17 detects the number of viewers of the main monitor 1 based on an image captured by the camera 11. The viewer number detection unit 17 detects the numbers of viewers of the sub-monitors 2-n based on images captured by the cameras 12-n. The cameras 12-n are, for example, digital cameras which include an imaging element such as a CCD (Charge-Coupled Device) or a CMOS (Complementary MOS).

The display content management unit 18 performs, for example, a channel setting for displaying video content distributed from a plurality of channels on the main monitor 1 and the plurality of sub-monitors 2-n. The display content management unit 18 manages the plurality of pieces of channel information and the main monitor 1 and the plurality of sub-monitors 2-n in association with each other.

The display content management unit 18 manages the channel information of the display content being displayed by the main monitor 1. The display content management unit 18 manages the channel information of the display content being displayed by the sub-monitors 2-n. The display content management unit 18 changes the channel information when the display content to be displayed by the main monitor 1 and the plurality of sub-monitors 2-n is changed.

The display content management unit 18 assigns the channel information set as a default to the main monitor 1 and the plurality of sub-monitors 2-n. When there is a change in the channel information, the display content management unit 18 assigns to the main monitor 1 the channel information of the sub-monitor 2-n having the highest number of viewers.

The display content management unit 18 sets the channel information set as a default, or the channel information that distributed the video content that was most recently displayed, as an initial value when a new display is started. The video content is one that is distributed by television broadcasting, for example. In addition, the video content may be one distributed via a network, or may be content which is stored in a storage device and played back.

The display control unit 16, the viewer number detection unit 17, and the display content management unit 18 are components which are realized by, for example, a hardware processor such as a CPU (Central Processing Unit) executing a program (software). Some or all of these components may be realized by hardware (including a circuit unit; including circuitry) such as an LSI (Large Scale Integration), an ASIC (Application Specific Integrated Circuit), an FPGA (Field-Programmable Gate Array), or a GPU (Graphics Processing Unit), or by cooperative operation of software and hardware. The program may be stored in advance in a storage device such as an HDD (Hard Disk Drive) or a flash memory. Alternatively, the program may be stored in a removable storage medium such as a DVD or a CD-ROM, and then installed by attaching the storage medium to a drive device. Furthermore, the computer program may be transmitted to a computer by a communication line, and the computer receiving the transmission may execute the program.

[Operation]

Next, the operation of the display system 100 will be described. The display control unit 16 displays display content on the main monitor 1 based on display target information managed by the display content management unit 18. In the main monitor 1, the camera 11 captures an image of the viewers 6 that are viewing the display target displayed on the display surface of the main monitor 1. The camera 11 outputs the captured image of the viewers 6 to the viewer number detection unit 17 at a predetermined timing The predetermined timing is, for example, once every predetermined period. However, the predetermined timing may be set to an arbitrary timing as long as an image of the viewers can be captured for recognizing the number of viewers. At this time, the camera 11 simultaneously outputs information about the date and time the image was captured to the viewer number detection unit 17.

For example, the display control unit 16 causes the plurality of sub-monitors 2-n to respectively display a plurality of pieces of display content distributed from a plurality of channels based on the channel information of the display targets managed by the display content management unit 18.

In each sub-monitor 2-*n*, the camera 12-*n* captures an image of the viewers 7-*n* that are viewing the display target displayed on the display surface of the sub-monitor 2-*n*. The camera 12-*n* outputs the captured image of the viewers 7-*n* to the viewer number detection unit 17 at a predetermined timing. At this time, the camera 12-*n* simultaneously outputs information about the date and time the image was captured to the viewer number detection unit 17.

The viewer number detection unit 17 analyzes the image captured by the camera 11, and performs facial recognition processing with respect to the people to detect the number of viewers of the main monitor 1. The viewer number detection unit 17 recognizes the people's faces using the positions of feature points and the distances between feature points extracted from the captured facial image. The viewer number detection unit 17 detects the number of viewers in the captured image, based on the recognized faces.

The viewer number detection unit 17 may detect the number of viewers based on processing that detects the pupils of people's faces. The viewer number detection unit 17 recognizes the pupils of the people in a captured image based, for example, on the brightness in the image. The viewer number detection unit 17 detects the pupils of the people based, for example, on a captured image. The viewer number detection unit 17 recognizes the pupils of the people's faces using, for example, the positions of feature points and the distances between feature points extracted from an image containing the captured faces.

The viewer number detection unit 17 detects the number of viewers based on the detected pupils. Similarly, the viewer number detection unit 17 analyzes the images captured by the cameras 12-*n*, and performs facial recognition processing or pupil detection processing with respect to the people to detect the numbers of viewers of the sub-monitors 2-*n*. The viewer number detection unit 17 outputs the number of detected viewers of the main monitor 1 and the numbers of detected viewers of the sub-monitors 2-*n* to the display control unit 16.

The display control unit 16 compares the numbers of viewers of the sub-monitors 2-*n* detected by the viewer number detection unit 17. The display control unit 16 extracts, from among the plurality of sub-monitors 2-*n*, the sub-monitor 2-*n* having the highest number of viewers.

The display control unit 16 acquires from the display content management unit 18 the channel information of the video content (first display content) being displayed by the extracted sub-monitor 2-*n*. The display control unit 16 instructs, based on the channel information acquired from the display content management unit 18, the display content management unit 18 to change the channel information of the main monitor 1 to the channel information corresponding to the first display content, and causes the main monitor 1 to display the first display content.

As a result of the processing described above, the main monitor 1 displays display content, such as video content, which reflects the tastes of viewers.

When the display control unit 16 causes the first display content of the sub-monitor 2-*n* having the highest number of viewers is displayed by the main monitor 1, it may determine whether or not to continue to display the video content (second display content) already being displayed by the main monitor 1.

The display control unit 16 compares a first viewer number of the main monitor 1 acquired from the viewer number detection unit 17 with a predetermined threshold, and determines whether or not the first viewer number of the main monitor 1 is greater than the predetermined threshold.

If the first viewer number is less than or equal to the predetermined threshold, the display control unit 16 causes the main monitor 1 to display the first display content. If the first viewer is greater than the predetermined threshold, the display control unit 16 causes the second display content being displayed on the main monitor 1 to keep being displayed by main monitor 1. The predetermined threshold is set, for example, to a value for maintaining the number of people which is needed in order to maintain the display content of the main monitor 1.

As a result of causing the display control unit 16 to perform the determination processing described above, when the main monitor 1 has a certain number of viewers or more, it is possible to reduce the number of viewers who experience discomfort due to a sudden switching of the second display content, such as video content, being displayed by the main monitor 1.

Figure 3:
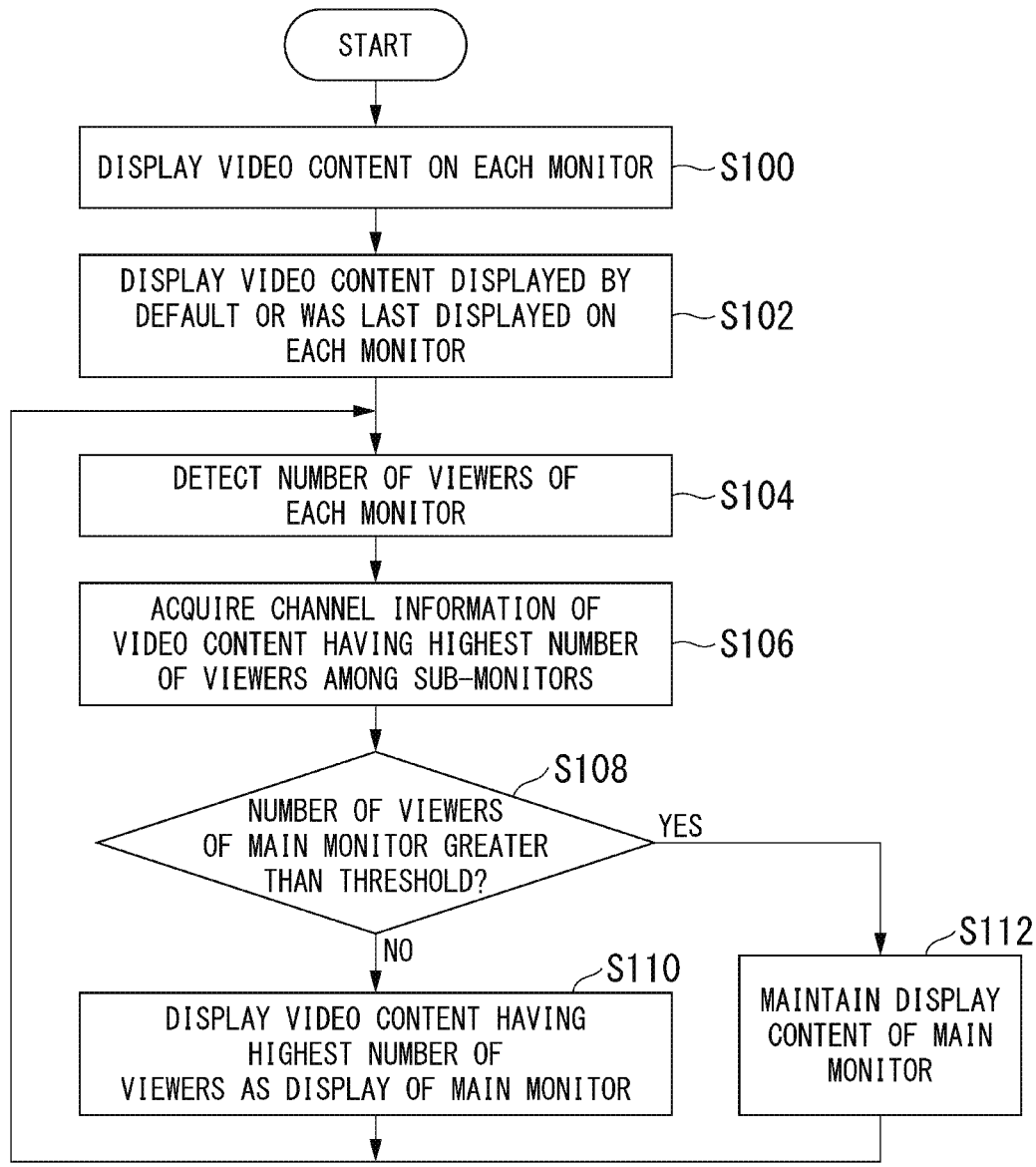
FIG. 3 is a flowchart showing an example of a processing flow executed in the display system 100.

Next, a processing flow executed in the display system 100 will be described. FIG. 3 is a flowchart showing an example of a processing flow executed in the display system 100. In the display system 100, processing which displays video content is started after the power is turned on. The display control unit 16 causes the main monitor 1 and the plurality of sub-monitors 2-*n* to display video content based on channel information acquired from the display content management unit 18 (step S100).

The display control unit 16 causes the main monitor 1 and the plurality of sub-monitors 2-*n* to display the video content that was displayed by default or that was most recently displayed (step S102). The viewer number detection unit 17 detects the numbers of viewers of the main monitor 1 and the plurality of sub-monitors 2-*n* (step S104). The display control unit 16 acquires from the display content management unit 18 the channel information of the sub-monitor 2-*n* having the highest number of viewers among the plurality of sub-monitors 2-*n* (step S106).

The display control unit 16 compares a first viewer number of the main monitor 1 acquired from the display content management unit 18 with a predetermined threshold, and determines whether or not the first viewer number of the main monitor 1 is greater than the predetermined threshold (step S108). When a negative determination is obtained in step S108, the display control unit 16 causes the main monitor 1 to display the first display content of the sub-monitor 2-*n* having the highest number of viewers (step S110). When a positive determination is obtained in step S108, the display control unit 16 causes the main monitor 1 to keep displaying the second display content being displayed by the main monitor 1 (step S112). After executing step S110 and step S112, the display control unit 16 returns the processing to step S104. The flowchart described above is executed, for example, until the display system 100 is turned off.

A program for realizing the functions of the display system 100 in FIG. 1 may be recorded on a computer-readable recording medium. The program recorded on the recording medium may be read by a computer system, and the processing which displays the video content having the highest number of viewers on the main monitor may be performed by executing the program. The "computer system" referred to here is assumed to include an OS and hardware such as a peripheral device. The "computer system" is also assumed to include a WWW system provided with a homepage providing environment (or display environment). Furthermore, the "computer-readable recording medium" refers to a portable medium such as a flexible disk, a magnetic optical disk, a ROM, or a CD-ROM, or a storage device such as a hard disk built into a computer system. In addition, the "computer-readable recording medium" is assumed to include those that retain the program for a fixed time, such as the volatile memory (RAM) inside a computer system serving as a server or a client in a case where the program is transmitted via a network such as the Internet, or a communication line such as a telephone line.

Furthermore, the program described above may be transmitted from a computer system storing the program in a storage device, or the like, to another computer system via a transmission medium or by a transmission wave in the transmission medium. Here, the "transmission medium" that transmits the program refers to a medium having an information transmission function, and includes networks (communication networks) such as the Internet, and communication lines (communication wires) such as telephone lines. Moreover, the program described above may be for realizing some of the functions mentioned above. In addition, it may be one that realizes the functions mentioned above by being combined with a program already recorded on the computer system, as a so-called difference file (difference program).

According to the example embodiment described above, the display system 100 is capable of displaying display content that more accurately reflects the tastes of viewers. Furthermore, when the display on the main monitor is switched, because the display system 100 determines whether or not the number of viewers of the main monitor is a sufficient number for maintaining the display content, it is possible to reduce the number of viewers who experience discomfort due to a sudden switching of the video content displayed on the main monitor.

The present invention is not limited to the example embodiment described above, and the present invention includes modifications and improvements and the like within a scope that enables the object of the present invention to be achieved. For example, according to the example embodiment described above, the display system 100 performs controls according to channel information about the video content being displayed by each monitor. Alternatively, the display system 100 may display video content on each monitor according to video content input in advance to an input terminal of each monitor. Further, based on information about the input terminal being displayed by each sub-monitor, the display system 100 may change the display content of the video content displayed on the main monitor by switching the input terminal of the main monitor. Moreover, the display system 100 may use a URL instead of channel information when distributing video content via a network.

REFERENCE SYMBOLS

1 Main monitor
2-n Sub-monitor
11 Camera
12-n Camera
16 Display control unit
17 Viewer number detection unit
18 Display content management unit
100 Display system

The invention claimed is:

1. A display system comprising:
a plurality of secondary display units that respectively display a plurality of videos;
a primary display unit that displays at least one of the plurality of videos;
a detection unit that detects a current number of viewers of each of the plurality of secondary display units; and
a control unit that causes the primary display unit to display a same video as the video being displayed by the secondary display unit having a currently highest number of viewers among the plurality of secondary display units, based on the respective current numbers of viewers detected by the detection unit, for the plurality of secondary display units,
wherein the control unit is configured to change a currently displayed video displayed on the primary display unit into the same video as the video being displayed by the secondary display unit having the currently highest number of viewers among the plurality of secondary display units, in a case that the currently displayed video displayed on the primary display unit is not the same video as the video being displayed by the secondary display unit having the currently highest number of viewers among the plurality of secondary display units.

2. The display system according to claim 1,
wherein the detection unit further detects a number of viewers of the primary display unit, and
the control unit determines whether or not the number of viewers of the primary display unit detected by the detection unit is greater than a predetermined threshold, and causes the primary display unit to display the same video as the video being displayed by the secondary display unit having the highest number of viewers when the number of viewers of the primary display unit is less than or equal to the threshold.

3. The display system according to claim 1,
wherein the detection unit further detects a number of viewers of the primary display unit, and
the control unit determines whether or not the number of viewers of the primary display unit detected by the detection unit is greater than a predetermined threshold, and causes the primary display unit to keep displaying a video being displayed on the primary display unit when the detected number of viewers of the primary display unit is greater than the threshold.

4. The display system according to claim 3, wherein the threshold is set to a value that is needed for maintaining the video being displayed on the primary display unit.

5. The display system according to claim 1,
wherein the primary display unit includes a first imaging unit that captures an image of viewers, and
the detection unit detects a number of viewers of the primary display unit based on the image captured by the first imaging unit.

6. The display system according to claim 5,
wherein each of the plurality of secondary display units includes a second imaging unit that captures an image of viewers, and
the detection unit detects the number of the viewers of the plurality of secondary display units based on the image captured by the second imaging unit.

7. The display system according to claim 6,
wherein the detection unit analyzes the image captured by the first imaging unit or the second imaging unit, executes processing of facial recognition, and detects the number of viewers of the primary display unit or one of the plurality of secondary display units.

8. The display system according to claim 6, wherein the detection unit analyzes the image captured by the first imaging unit or the second imaging unit, executes processing of detecting pupils, and detects the number of viewers of the primary display unit or one of the plurality of the secondary display units.

9. The display system according to claim 1, further comprising
a management unit that manages display content of the primary display unit and each of the plurality of secondary display units,
the management unit acquires, based on the numbers of viewers detected by the detection unit, information about a first display content being displayed by the secondary display unit having the highest number of viewers among the plurality of secondary display units, and
the control unit causes the primary display unit to display the first display content based on the information.

10. A display method executed by a computer, the method comprising:
displaying a plurality of videos on a plurality of secondary display units, respectively;
displaying at least one of the plurality of videos on a primary display unit;
detecting a current number of viewers of each of the plurality of secondary display units;
displaying, on the primary display unit, a same video as the video being displayed by the secondary display unit having a currently highest number of viewers among the plurality of secondary display units, based on the detected respective current numbers of viewers, for the plurality of secondary display units; and
changing a currently displayed video displayed on the primary display unit into the same video as the video being displayed by the secondary display unit having the currently highest number of viewers among the plurality of secondary display units, in a case that the currently displayed video displayed on the primary display unit is not the same video as the video being displayed by the secondary display unit having the currently highest number of viewers among the plurality of secondary display units.

11. A non-transitory computer-readable recording medium storing a program that causes a computer to execute:
causing a plurality of secondary display units to respectively display a plurality of videos;
causing a primary display unit to display at least one of the plurality of videos;
detecting a current number of viewers of each of the plurality of secondary display units;
causing the primary display unit to display a same video as the video being displayed by the secondary display unit having a currently highest number of viewers among the plurality of secondary display units, based on the detected respective current numbers of viewers, for the plurality of secondary display units; and
changing a currently displayed video displayed on the primary display unit into the same video as the video being displayed by the secondary display unit having the currently highest number of viewers among the plurality of secondary display units, in a case that the currently displayed video displayed on the primary display unit is not the same video as the video being displayed by the secondary display unit having the currently highest number of viewers among the plurality of secondary display units.

\* \* \* \* \*